Oct. 20, 1925.
R. R. NORWOOD
SUPPORTER
Filed Jan. 11, 1923
1,558,202
2 Sheets-Sheet 2
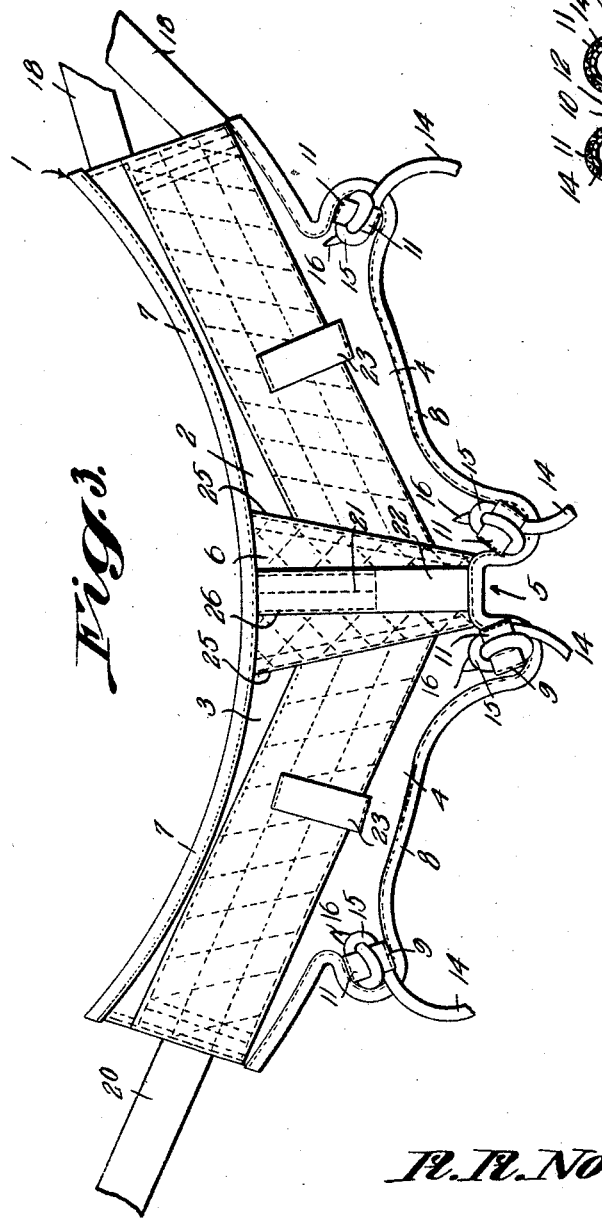
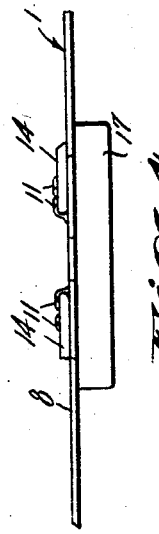
R. R. Norwood, Inventor
By C. A. Snow & Co.
Attorneys Patented Oct. 20, 1925.

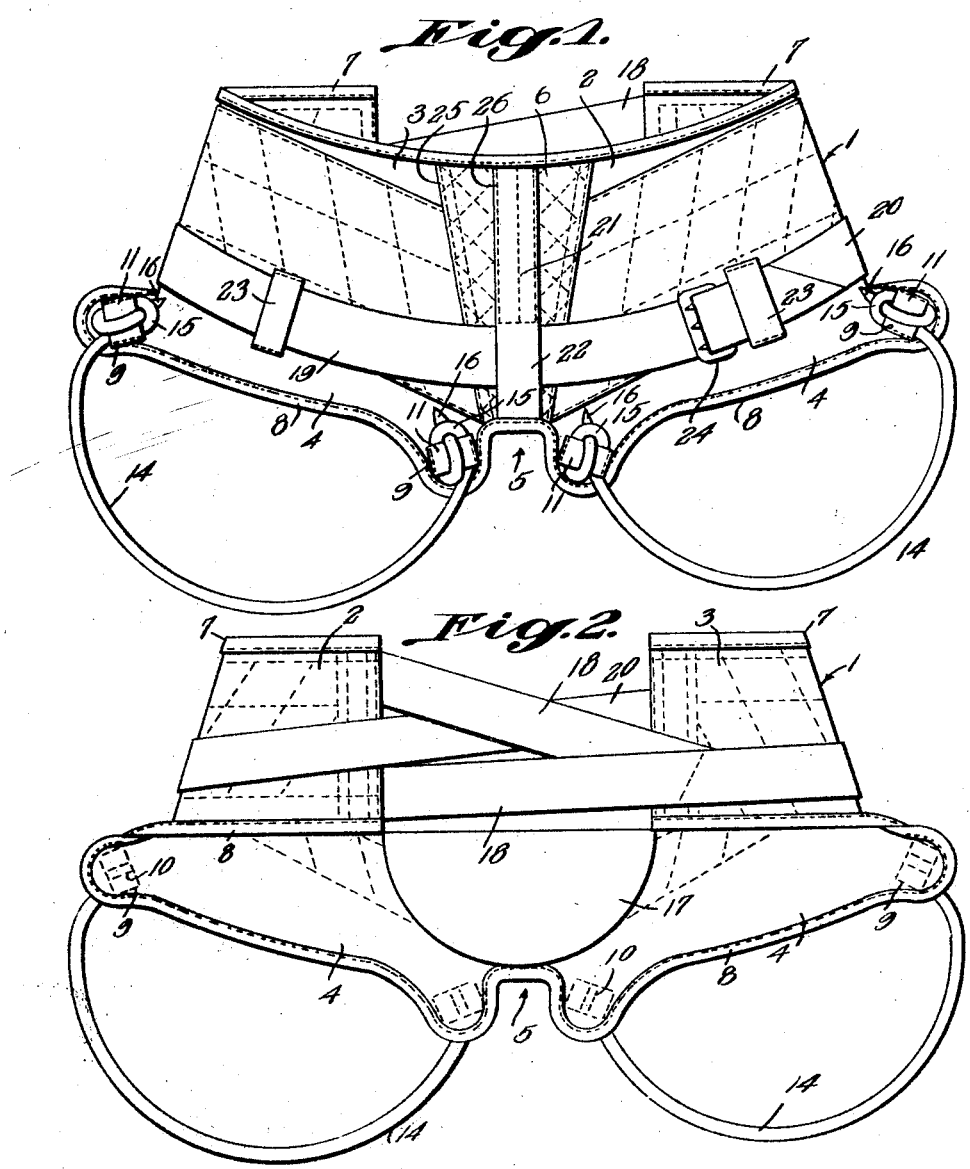

1,558,202

UNITED STATES PATENT OFFICE.

ROBERT REED NORWOOD, OF MINERAL WELLS, TEXAS.

SUPPORTER.

Application filed January 11, 1923. Serial No. 612,068.

*To all whom it may concern:*

Be it known that I, ROBERT R. NORWOOD, a citizen of the United States, residing at Mineral Wells, in the county of Palo Pinto and State of Texas, have invented a new and useful Supporter, of which the following is a specification.

The device forming the subject matter of this application is an abdominal supporter, and the invention aims to provide a device of the kind specified which may be adjusted readily to accommodate patients of different statures and shapes, and is so constructed that it will support the abdomen under various pathological conditions.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in front elevation, a device constructed in accordance with the invention; Figure 2 is a rear elevation; Figure 3 is a plan wherein the supporter is laid out flat, parts being broken away; Figure 4 is a view wherein a portion of the supporter is viewed edgewise; and Figure 5 is a fragmental sectional view.

The device forming the subject matter of this application preferably is made of cloth or any other suitable flexible material, and includes a body 1 comprising side members 2 and 3 having depending wings 4, which are spaced apart at their inner ends, as shown at 5. An extension 6 is located between the side members 2 and 3 and has converging edges 25 secured to the inner ends of the side members 2 and 3. Wherever the word secured is used in this specification it will be understood that stitching preferably is referred to. An upper binder 7 is secured to the upper edges of the side members 2 and 3 and to the upper end of the extension 6. A lower binder 8 is secured to the lower edges of the wings 4 and to the inner edges of the wings 4, as well as to the lower end of the extension 6.

Flexible strips are secured intermediate their ends, as shown at 10, and at their ends, as shown at 9, to the wings 4, at the front of the supporter and at the sides thereof, as shown in Figure 1, to form eyes 11, disposed in pairs as shown in Figure 5 and to form sockets 12 between the eyes of each pair. Perineal straps 14 are provided, and may be in the form of flexible rubber tubes, although the perineal straps may be of any desired construction. At each end, each of the perineal straps 14 is formed into a loop 15 extended through one pair of eyes 11, the end of the perineal strap being extended through the socket 12 and being extended through the loop 15, as shown very clearly in Figure 3, an unusually secure mounting for the ends of the perineal straps thus being provided.

To the inner surface of the front portion of the body 1 of the belt, a pad 17 is secured. The pad may be made of any desired material and may be of any shape, the semi-circular outline shown in Figure 2 being a useful but not mandatory form.

The ends of a reinforcing strip 21 are engaged within the binders 7 and 8, the strip being secured in its upper portion as shown at 26 in Figure 1, to the extension 6, the lower portion of the member 21 being spaced from the extension 6, to form a keeper 22. Other keepers, denoted by the numerals 23, are secured to the side members 2 and 3, and are located on opposite sides of the keeper 22.

Diverging flexible elements 18 are secured to the rear end of the side member 2, one of the flexible elements 18 being continued to form a tongue 19. A tongue 20 is secured at its rear end to the side member 3 and terminates in a buckle 24. As shown in Figure 2 the tongues 19 and 20 are extended in opposite directions about the supporter, the tongue 20 passing between the flexible elements 18. The tongues 19 and 20 are prolonged beneath the keepers 23, and one of the tongues, if desired, the tongue 19, is extended through the keeper 22, the end of the tongue 19 being engaged with the buckle 24 on the end of the tongue 20, all of which will be understood clearly when Figure 1 of the drawings is noted.

The device is so constructed that it may be adjusted readily upon the body of the wearer, to afford the necessary support for the abdomen. The extension 6 may be detached from its position at the front of the supporter and another extension differently shaped or of differnet size may be substituted therefor, thus adapting the garment to the particular needs of the wearer.

The pad 17, further may be made of any desired size or shape and will aid in upholding the abdomen.

What is claimed is:—

An abdominal support in the form of a belt comprising side members and an extension located between the side members and secured to the forward ends of the side members; the extension having downwardly converging side edges and the upper edge of the belt being downwardly concaved continuously from one end of the belt to the other and the lower edges of the side members being straight and converging downwardly from the ends of the belt to the extension whereby the belt will assume a definite and fixed frusto-conical form about the body of the wearer, the upper edge of the extension being continuous and unbroken and there being a continuous binder along the entire upper edge of the belt to aid in preserving said definite and fixed frusto-conical form in the belt; keepers secured to the belt at the lower edge thereof and upon the front thereof, tongues extended through the keepers, means for connecting the tongues detachably together at the front of the belt, the tongues being crossed on each other at the rear of the belt and being connected to the rear ends of the side members near to the upper edges thereof, the construction being such as to aid in preserving the said frusto-conical form of the belt, the side members of the belt having depending wings, and perineal straps carried by the wings.

In testimony that I claim the foregoing as my own, I have hereto affixed my signature.

ROBT. REED NORWOOD.